United States Patent [19]

Baverstock

[11] 4,020,810
[45] May 3, 1977

[54] ECONOMIZER VALVE FOR USE WITH GAS-POWERED INTERNAL COMBUSTION ENGINES

[75] Inventor: Richard Baverstock, Long Beach, Calif.

[73] Assignee: Impco Carburetion, Inc., Cerritos, Calif.

[22] Filed: Oct. 8, 1975

[21] Appl. No.: 620,260

[52] U.S. Cl. .................... 123/120; 261/DIG. 68; 261/69 A; 48/180 C

[51] Int. Cl.² .................................. F02M 21/02

[58] Field of Search ....... 261/50 A, 69 A, DIG. 68; 123/120, 27 GE; 48/180 C, 180 R

[56] References Cited

UNITED STATES PATENTS 2,896,599  7/1959  Ensign .......................... 123/120
3,215,132  11/1965  Spencer ......................... 123/120

Primary Examiner—Ronald H. Lazarus
Attorney, Agent, or Firm—Donald D. Mon

[57] ABSTRACT

An economizer valve for use with an induction and fuel supply system for an internal combustion engine operated on gaseous fuels, for example, LPG or natural gas. The system is used with a conventional mixing valve which supplies air according to engine demand, together with fuel appropriate to the desired charge, and includes a regulator for providing gas to the mixing valve, and an economizer valve responsive to pressure regions upstream from and at and downstream from a throttle valve, effective on the regulator to cause it to lean out the charge under certain conditions and to permit the charge to be enriched at other conditions.

21 Claims, 8 Drawing Figures

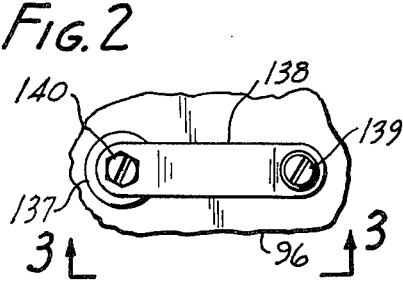
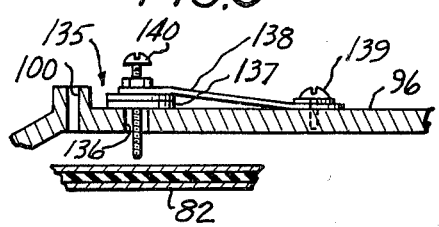
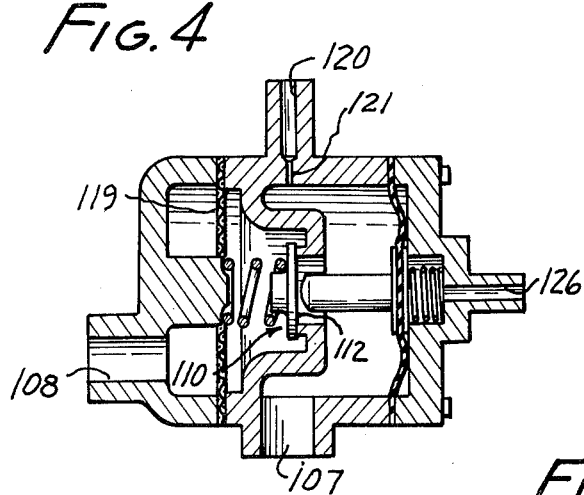
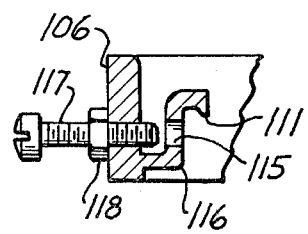
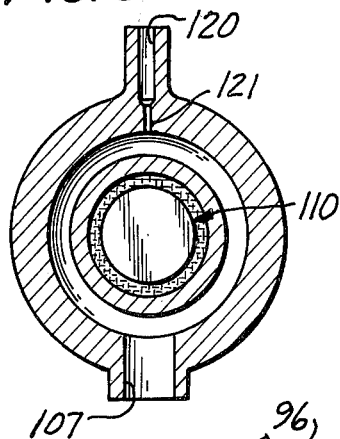
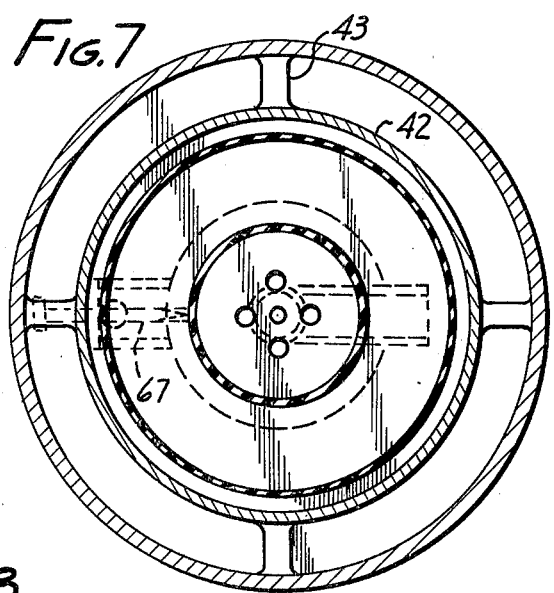
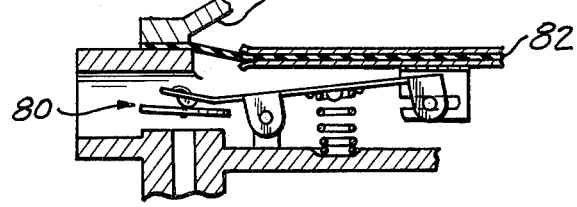

ECONOMIZER VALVE FOR USE WITH GAS-POWERED INTERNAL COMBUSTION ENGINES

This invention relates to an economizer valve for internal combustion engines that are powered by gaseous fuels and which utilize a regulator and a mixing valve, and to a system incorporating the regulator and the economizer valve.

It is known that it is advantageous for an engine to operate on as lean a mixture as is possible without misfiring, especially at low and intermediate loads, because to do so results in a minimum output of the pollutants known as hydrocarbons (HC), oxides of nitrogen (NOx), and carbon monoxide (CO). It is also known that lean mixtures will not generally burn reliably under some engine conditions such as starting, idling and decelerating. Accordingly, it is desirable to enrich the charge under conditions where misfiring may occur, but to lean the charge under other conditions, such as low and intermediate load level driving.

The prior art is replete with efforts to utilize intake manifold pressure as a signal to cause adjustment of the air/fuel ratio of the charge, but in general they have been less than optimal, because individual manifold pressures are not uniquely associated with individual engine operating conditions.

It is an object of this invention to provide an economizer which takes advantage of the unique properties of an air mixer valve in a gaseous-fueled engine system wherein a substantially constant sub-atmospheric pressure exists upstream of the throttle valve at the air valve. By using this upstream pressure as a reference, the manifold pressure can be utilized as a signal means to adjust the air fuel ratio under certain circumstances, whereby the air/fuel charge is leaned out at low and intermediate load conditions.

The invention serves an internal combustion engine operated on gaseous fuels. Such an engine includes in its induction system a mixing valve which supplies air and fuel in response to the engine's demand. Fuel is supplied to the mixing valve by a regulator. An economizer valve according to this invention is operable on the regulator, whereby at certain engine operating conditions it allows the regulator normally to deliver fuel sufficient to form a relatively richer charge, and at other engine operating conditions to deliver fuel sufficient to form only a leaner charge.

According to an optional feature of the invention, the regulator may be provided with means responsive to the position of the regulator diaphragm to enable the charge to be made richer.

The preferred embodiment of economizer valve according to this invention comprises a valve body with a control port for connection to that one of the regulator regions in which a lesser pressure tends to close the regulator valve, an air inlet port, a spoiler valve between the air inlet port and the control port, an air bleed port interconnecting the control port and the atmosphere for restricted flow of air to the control port, a suction port for connecting the control port to a region upstream of the throttle valve in the induction system, and a spoiler valve actuator including a signal port for connection to a region downstream of the throttle valve. Sufficiently low pressure in the valve actuator from the downstream region permits closure of the spoiler valve.

The above and other features of this invention will be fully understood from the following detailed description and the accompanying drawings, in which:

FIG. 2 is a partial top view taken at line 2—2 in FIG. 1;

FIG. 3 is a fragmentary cross-section taken at line 3—3 of FIG. 2 showing a portion of the invention in another operating position;

FIG. 4 is an axial cross-section of the economizer valve in FIG. 1 in another operating position;

FIG. 5 is a fragmentary view showing a detail of the economizer valve of FIGS. 1 and 4;

FIG. 6 is a cross-section taken at line 6—6 of FIG. 1;

FIG. 7 is a cross-section taken at line 7—7 of FIG. 1; and

FIG. 8 is a fragmentary side view, principally in cross-section, showing a fragment of the regulator in a valve-open condition.

Figure 1:
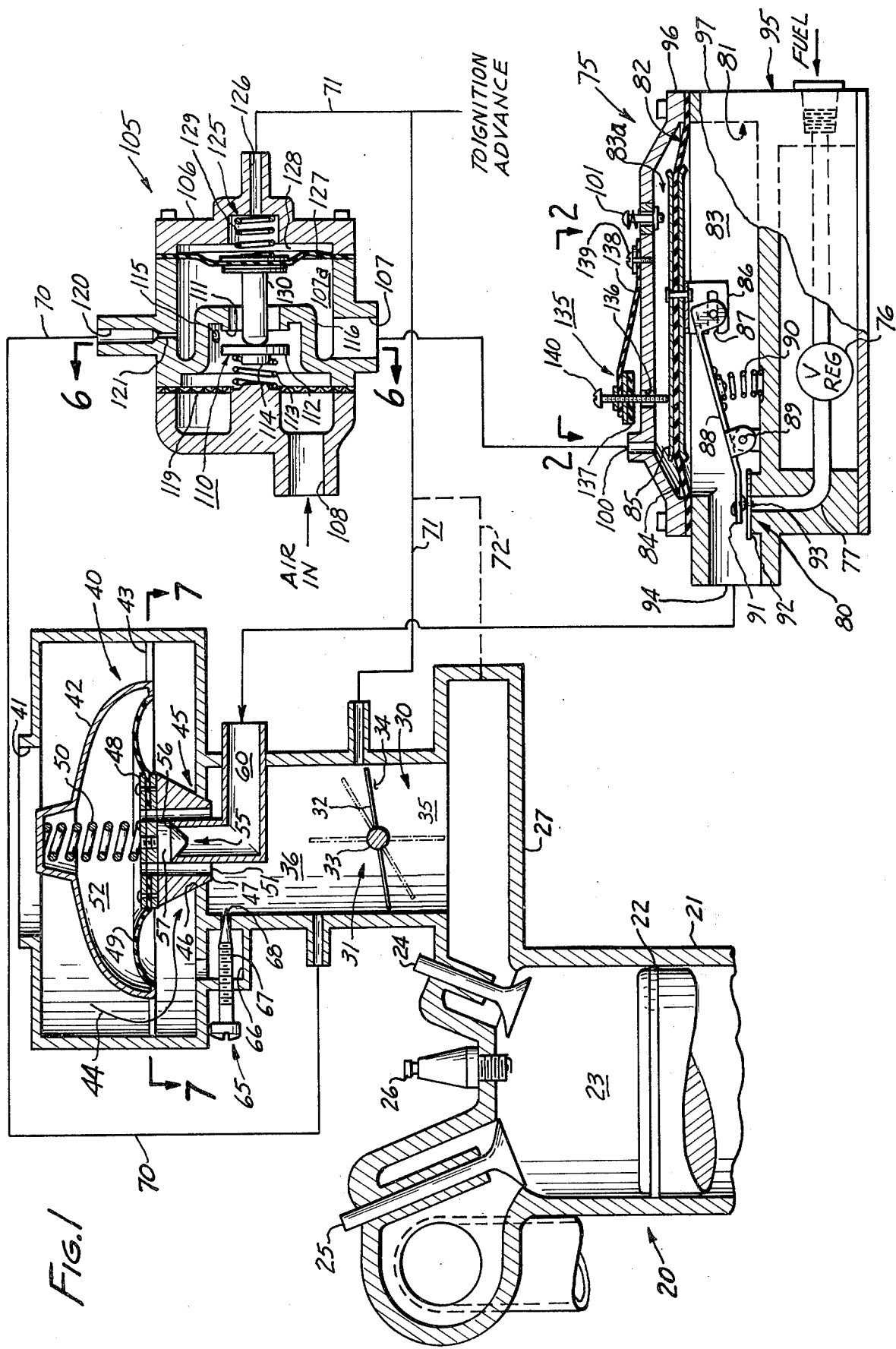
FIG. 1 is a schematic system view, principally in cross-section notation, showing the presently preferred embodiment of the invention.

The system of the invention is applicable to an internal combustion engine 20 of the generally-known type wherein a plurality of cylinders, of which one cylinder 21 is shown, has a piston 22 axially slidable therein so as to be reciprocated by the burning of a fresh charge in, and the exhaust of a spent charge of fuel and air from, the combustion chamber 23 above the piston. A respective intake valve 24 and an exhaust valve 25 are provided for each cylinder, as is a respective spark plug 26.

The cylinders are fed the combustible charge from an intake manifold 27. In accordance with known constructions, the illustrated intake manifold is connected to all of the cylinders, and the respective valves and spark plugs are actuated in sequence so as to sequentially fire each cylinder, and thereby cause the engine to run in accordance with known techniques.

The region upstream of the intake valve is herein referred to as the "induction system" 30. In the intake manifold there is included a throttle valve 31 whose angular setting determines the speed of the engine. It includes a butterfly plate 32 mounted to a throttle shaft 33. It is shown in its most closed position in solid line. This most closed position is occupied at idling and deceleration conditions. The two positions shown in dotted line are the wide open position for starting and full load, and the intermediate position for low and intermediate loads. Of course, the setting is a continuously adjustable one. These are merely arbitrarily selected examples.

The region at or downstream from a point 34 (about where the throttle plate is when it is at its most closed position) is sometimes referred to as the "donwstream region" 35. This region extends from the butterfly plate to the intake valve. The region upstream from the throttle valve is sometimes referred to as an "upstream region" 36. There are other types of throttle valves besides butterfly valves. In systems utilizing the other types, the same kind of definition of upstream and downstream region is applicable. Generally it refers to the fact that a closed or partially open throttle valve creates a difference in pressure above and below it. The lower-pressure region is downstream when a mixing valve is used.

A mixing valve 40 is schematically shown in FIG. 1. It is typical of air/fuel mixing valves (sometimes referred to as "carburetors") that are generally utilized in gaseous fuel installations. Its function is to provide air as demanded by the engine, and to supply gaseous fuel to the air at a rate which will make a combustible charge suitable for the engine to operate on. An air intake 41 is located upstream of the mixing valve itself. It is a feature of such valves that they tend to maintain a substantially constant pressure immediately downstream, as will be discussed in detail below.

The mixing valve includes a housing 42 supported in the intake by a spider 43 (FIG. 7). Incoming air flows past the housing as shown by arrows 44.

An air valve 45 comprises a seat member 46, within which there is axially slidably disposed a tubular externally tapered air metering member 47 with a perforated plate 48 at its top end. The plate and the metering member are mounted to a diaphragm 49 which extends across a lower open end of the housing in sealing relationship therewith. The diaphragm extends peripherally around the metering member and supports it for vertical axial movement in opposition to a downward force exerted by bias spring 50. The spring tends to close the air valve, and the air valve will remain closed unless the metering member is lifted upward. A pressure passage 51 communicates pressure from the upstream region to the actuating chamber 52 of the mixing valve. A sufficiently reduced pressure in actuating chamber 52 will cause the seat member to move upwardly in FIG. 1 as a consequence of the differential pressure between atmosphere on the bottom (outside) portion of the diaphragm and the reduced pressure in actuating chamber 52, and the amount of movement will be proportional to engine demand.

A gas metering valve 55 is disposed inside the air metering member 47. It includes a gas valve seat 56 mounted to the body. A gas valve stud 57 is mounted to the valve plate. It is tapered, and extends into the gas valve seat. It forms a variably sized orifice to pass fuel through gas metering valve 55. Raising the metering means 47 simultaneously opens both the air valve and the gas metering valve to provide a coordinated supply of air and fuel. The shapes of the outer wall of the metering member and of the stud are selected to provide the correct orifice areas for each axial position. A gas supply conduit 60 passes through the body of the mixing valve and supplies gas to the gas valve seat.

An idle bypass 65 comprises an idler conduit 66 extending from the air intake into the upstream region. An idle adjustment screw 67 adjusts the size of idler orifice 68 and thereby determines the rate of air flow which bypasses the air valve 45.

The foregoing represents an entirely conventional mixer valve construction well known in the art. For further details of this general class of device, reference may be had to Baverstock U.S. Pat. No. 3,846,094, issued Nov. 5, 1974.

A vacuum conduit 70 departs from the upstream region. A signal conduit 71 departs from a location near point 34. Depending on the angular setting of the throttle plate, signal conduit 71 may find itself exposed to pressure of either the upstream or the downstream region. An optional technique available with this invention utilizes signal conduit 72 instead of signal conduit 71. Conduits 71 and 72 are connected to other elements of the invention yet to be described.

A regulator 75 is a standard type of regulator well known in the trade, for example Regulator Model E as produced by Impco, a division of A. J. Industries, Inc., 16916 Gridley Place, Cerritos, Calif. This is a two-stage regulator which can be used along with a vaporizer. The vaporizer converts propane gas from its liquid state to its gaseous state at a relatively high pressure. Alternatively, the regulator can be directly supplied with fuel in its gaseous state. It is usual for the incoming gas to be received at a pressure of about 200 psig. A first-stage regulator valve 76 reduces this pressure to approximately 1.5 psig. A gas line 77 conveys the gas from the first-stage regulator valve to a second-stage regulator valve 80. An important feature of this invention is a modified control of the second-stage regulator valve in response to certain operating conditions of the engine.

In accordance with known regulator construction, the second-stage regulator valve includes a regulator chamber 81 having a regulator diaphragm 82 which divides the regulator chamber into a pair of separate regulator regions 83, 83a. The diaphragm is made from a flexible sheet 84 and a rigid backing member 85. The backing member may be a metal plate that is glued or riveted to the flexible sheet. A clevis 86 is mounted to the backing member. It has a slot 87 to receive the end of a lever 88. The lever is mounted by hinge 89 to the body of the regulator, and a bias spring 90 biases the right-hand end of the level in FIG. 1 upwardly. Bias spring 90 thereby tends to move the diaphragm upwardly. An arm 91 of the lever tends to move a valve seal 92 toward a valve seat 93 at the terminal end of gas line 77.

Accordingly, bias spring 90 tends to close the second-stage regulator valve. This valve will be open only when there is a sufficient differential force on the diaphragm or a mechanical force on the diaphragm to press it, and the right-hand end of lever, downwardly in FIG. 1 to overcome the bias spring force. FIG. 8 shows the second-stage regulator valve in an open position. It will be evident that within limits the farther down the diaphragm is located the more gas will flow through the second-stage regulator valve. Therefore, this is an adjustable valve. The rate of gas flow is a function of the diaphragm position. Speaking generally, this valve is set so as normally to deliver gas at such a rate as to form a relatively rich charge. The charge is leaned by reducing the pressure in region 83a.

The regulator chamber has a gas outlet 94 which is connected to the gas supply conduit 60. It supplies gas from the regulator chamber to the gas metering valve.

Further with regard to the regulator chamber, the regulator includes as part of its body 95 an upper closure 96 which is clamped by screws or other fasteners against the outside edge of the diaphragm. This clamps the diaphragm to the base portion 97 of the body and completes a peripheral closure of the regions. A port 100 in closure 96 enters upper region 83a which is that region wherein a lesser pressure will tend to close the second-stage regulator valve 80. In conventional usage port 100 is an atmospheric vent always open to atmosphere. This port is used for purposes of this invention as described, instead of as a straight vent to atmosphere.

A primer pin 101 passes through the closure. It can exert a mechanical downward pressure on the regulator diaphragm through a seal (not shown) to manually open the valve 80 and provide a burst of fuel for priming the engine.

An economizer valve 105 includes a valve body 106 which has a control port 107 for connection to port 100 and thereby to region 83a. The "control port" is defined as also including an extension 107a in the form of a chamber within the valve body. This is for purposes of convenience in disclosure and specification, rather than a limitation to the illustrated embodiment.

The valve body also includes an air inlet port 108 and a spoiler valve 110 which is disposed between the air inlet port and the control port. In this embodiment, the spoiler valve includes a spoiler valve seat 111, a spoiler valve seal 112, and a spoiler valve bias spring 113. This bias spring tends to press seal 112 against valve seat 111 so as to close the spoiler valve unless and until the seal 112 is forced off the seat. A stud 114 supports the bias spring 113 at one end.

An adjustable air bleed port 115 extends from atmosphere to the control port to provide a restricted flow of air from atmosphere to the control port. Air bleed port 115 can, of course, enter the valve body at any place, but the most convenient location for it is in a ring support 116 that mounts spoiler valve seat 111. The ring support has a wall through which the port is formed (see FIG. 5). An adjustment screw 117 is threaded through body 106. The location of its tip can adjustably be set relative to the air bleed port to set the rate of flow of air therethrough as a function of the size of the opening which it leaves. Screw 117 has a tapered end for metering as shown, and a lock nut 118 holds the screw in an adjusted position. The air bleed port receives air from air inlet port 108. Port 108 is always open to atmosphere. A filter 119 can be placed inside the body to clean the incoming air.

A suction port 120 passes through the valve body to interconnect the control port to the upstream region via vacuum conduit 70. A restrictive orifice 121 is included in suction port 120.

A spoiler valve actuator 125 is formed in the body. The actuator communicates with a signal port 126 that is connected by means of signal conduit 71 to the "downstream portion" of the induction system just upstream from point 34. As is more fully described below, when the throttle valve is closed, signal conduit 71 is connected to the upstream portion. The actuator includes a diaphragm 127 which forms an actuator chamber 128 of variable volume. Chamber 128 is fluidly interconnected with signal port 126. A bias spring 129 is inside the chamber and compressed between the wall of the valve body and diaphragm 127. A post 130 is attached to diaphragm 127. The length of post 130 is such that when there is insufficient suction in the actuator chamber to retract the diaphragm and the post, it will bear against spoiler valve seal 112 and the force exerted on the post by bias spring 129 will unseat it in opposition to the spoiler valve bias spring 113. The length of the post is such that when it is withdrawn as a consequence of compressing bias spring 129, it does not impede the free closure of the spoiler valve. A sufficiently low pressure in the valve actuator from the downstream region will permit closure of the spoiler valve by retracting the post from a position where it would tend to unseat valve seal 112. As a consequence, the diaphragm will move upwardly and valve 80 will be a bit more closed, thereby to deliver less gas for a given engine demand. This will lean the charge. A higher pressure in the downstream region, when conveyed to the actuator, enables the actuator to be moved by the bias spring to open the spoiler valve and enrich the mixture by raising the pressure region 83a.

In some installations it is desirable to spoil the vacuum in regulator region 83a as a consequence of a predetermined regulator diaphragm position. This is the case when the ignition advance port (signal conduit 71) is not located where it will be exposed to pressure of the upstream region when the throttle valve is closed. It is also the situation if conduit 72 is used instead of conduit 71, because then it always transmits downstream pressure. For example, if signal conduit 71 receives low pressure from the downstream region when the throttle is closed, the charge at idle and deceleration conditions would be leaned instead of enriched. Means must be provided to overcome this disadvantage if the system is to be universally applicable.

A secondary spoiler valve 135 for this purpose is shown in FIGS. 1, 2 and 3. The use of this additional valve is optional, but it is shown in all the FIGS. for the purpose of illustration. Secondary spoiler valve 135 is formed on the upper closure 96 of the regulator. It includes a spoiler port 136 which is overlaid by a valve plate 137. The valve plate in turn is connected to a strap 138 that is mounted to closure 96 by a screw 139. An adjustment screw 140 is threaded through the valve plate and extends with a clearance into the region 83a where it will be contacted and lifted by the diaphragm at a diaphragm position determined by the location of the screw relative to the valve plate. As the diaphragm moves upwardly, it contacts the screw at some predetermined elevation, and with additional upward movement moves the screw up so to lift the valve plate. The valve plate is shown closing port 136 in FIG. 3. It is shown lifted and opening the port in FIG. 1. When the plate is lifted, atmospheric pressure is dumped into region 83a for purposes and with effects later to be described, regardless of whether conduit 71 (or conduit 72 when used) is receiving low pressure from the downstream region.

The operation of the system will now be described. It is the basic intended function of this invention to economize the charge by causing it to be leaner at low and intermediate load conditions, and to cause it to be richer at idling, deceleration, heavy load and starting. Especially when the conduit 72 is used, it is desirable to be certain that the enrichment occurs at a given engine condition, regardless of the manifold pressure. When conduit 71 is used, additional assurance and adjustability is desirable.

The foregoing objectives are attainable with the instant invention because in gas-powered engines, as contrasted with gasoline-powered engines, pressure in the upstream region between the mixer valve and the throttle does not vary greatly from one operating condition to another. The mixer valve tends to maintain a predetermined pressure. Usually pressure in this region varies only from about −6.0 to about −12.0 inches of water column (−0.44 to −0.88 inch of mercury). This is a substantially constant pressure when contrasted with the wide variation in the manifold pressure, which can vary from about −6.0 inches of water to about −340.0 inches of water. The pressure in the upper region, even though it does vary, does so over such a narrow range that it can be used as a reliable comparison source of pressure. This enables the charge to be enriched by comparison with the manifold pressure (in the downstream region) in a way wherein the effectiveness does not deteriorate with decreasing manifold pressures. It functions reliably and precisely when it is intended to function, and means is thereby provided for providing the enrichment or leaning function to operate at precisely adjustable conditions.

The system is shown at rest, with the throttle plate in an arbitrary position (closed in solid line) in FIG. 1. When the engine is first started, it is mechanically cranked by a starter motor with the throttle open, and this reduces the pressure in both the upstream and the downstream regions. In particular, it lowers the pressure through the pressure port 51 and into the actuating chamber 52, which causes the diaphragm to move the air valve 45 and the gas valve stud upwardly. This admits a quantity of air and gas into the upstream region to form a starting charge. Air is also drawn through the idle bypass.

The negative pressure in the induction system will be communicated through the gas supply conduit 60 to exert a demand on regulator 75. This lower pressure is applied to the lower regulator region 83. A higher pressure in region 83a results in a force that moves the regulator diaphragm 82 downwardly, opening the secondary stage regulator valve to provide the gaseous fuel. The pressure in the upstream region is conveyed through vacuum conduit 70 to suction port 120 of the economizer valve. Pressure in the downstream region is conveyed through signal conduit 71 to the signal port 126. The suction in chamber 128 is insufficient to compress spring 129 and move the actuator post 130 away from the spoiler valve, and accordingly the spoiler valve is open as shown in FIG. 1. This allows atmospheric pressure to enter through port 108 and pass through the spoiler valve and dump into the control port 107 and the upper region 83a of the regulator valve. This is the said higher pressure, and is the highest possible pressure (atmospheric) for the upper region 83a. This causes the greatest possible opening of the secondary stage regulator valve relative to a given upstream pressure. The effect is to enrich the mixture at starting. This condition continues, with the setting of the regulator valve 80 determined by the differential pressure between atmosphere and engine demand until engine conditions become such as to exert, at signal port 126, sufficient suction to draw diaphragm 127 of the actuator far enough to pull post 130 out of contact with the spoiler valve seal 112, which bears against valve seat 111 and closes this valve.

Now the only flow of air into control post 107 (or into its extension 107a) is through the air bleed port 115, the rate of which has been adjusted by turning and tightening its adjustment screw 117. This bleed flow adjustably, but only partially, spoils the vaccum produced by the communication with the upper region, and therefore establishes a pressure at control port 107, and therefore in region 83a, at some adjusted value between atmosphere and the pressure in the upper region of the induction system. Accordingly, this lessened pressure on the top of the regulator diaphragm causes a movement upward and movement toward closure of regulator valve 80, and tends to lean out the charge.

The precise amount of leaning can be adjusted by the adjustment screw 117, thereby constituting a fine tuning adjustment by adjusting the vacuum exerted in regulator chamber 83.

The pressure at which the actuator will become effective in opening and closing the spoiler valve can be adjusted by appropriate selection of the length, strength and rate of the springs of the actuator and of the spoiler valve. It will ordinarily be selected to be operated so as to cause the charge to lean at pressures between −13.6 and −68.0 inches of water column in the downstream region. At pressures less than about −68.0 inches of water, the charge will be enriched. When the pressure in the downstream region falls below the selected value, the value condition will change to cause the enrichment of the charge.

After the engine catches, it may idle. Under idling circumstances, the throttle is closed as shown in solid line. Then pressure in the upstream region is about −6.0 inches of water, and in the downstream region it is about −285.6 inches of water. The mixer valve maintains the upstream region pressure at the substantially constant pressure. The downstream pressure is lower as a consequence of the restrictive action of the nearly closed throttle. It resists flow to meet the lesser pressure pulled by the engine.

The actuator is adjusted so as to permit the spoiler valve to close at pressures less than about −41.0 inches of water. If the manifold pressure (which is sub-atmospheric) were conveyed to the actuator port, the spoiler valve would be closed and the charge would be leaned out just when it is intended to be enriched.

The result is prevented because, with the throttle closed, the conduit 71 is upstream of the throttle valve, and exposed to the higher pressure therein, rather than to the lower pressure in the downstream region. This situation also occurs under deceleration conditions. Therefore, when conduit 71 opens into the intake manifold where the throttle plate acts as a "selection valve" to expose conduit 71 to upstream or downstream pressure, the lower downstream pressure does not cause the spoiler valve to close, and leaning of the charge is averted.

The conduit may enter the intake manifold at a location where the selection feature is less effective. This may occur when existing throttle bodies are used in converting an engine to gaseous fuel. Then a fine-tuning is desired to spoil the vacuum in region 83a. This is the function of the secondary spoiler valve, whose operation is reponsive to engine demand. Also this is useful when a different type of throttle is used, or where a conduit such as conduit 72 connects to the intake manifold in the downstream region. In this latter situation, the secondary spoiler valve constitutes the only reliable means to spoil the vacuum in region 83a at idle or deceleration condition.

Orifice 121 can be provided together with the secondary spoiler valve. When the diaphragm reaches the position respective to idling or to deceleration, it contacts the tip of screw 139 and opens the secondary spoiler valve. This admits atmospheric air to regulator chamber 83a, and the charge is enriched, even though the actuator may in fact be actuated to close spoiler valve 110. The precise point of actuation of the secondary spoiler valve is set by screw 140.

Deceleration conditions are similar to idling conditions, except that the manifold pressure is still lower — about −340 inches of water. The throttle is closed, and the same settings are attained as in idling.

At heavy load conditions, the upstream region pressure will be between about −6.0 and −12.0 inches of water. The throttle is wide open, and downstream and upstream region pressures are equal. The spoiler valve remains open, and the charge is enriched.

At low load the throttle valve is open enough to connect signal conduit 21 to the downstream region and pressure in downstream region is −68.0 to −245.0 inches of water which moves actuator and closes spoiler valve 110. This causes a slight vacuum in chamber 107a derived from conduit 70 which is transferred to chamber 83a and leans the mixture charge.

The following is a table of pressures and settings summarizing the foregoing:

| Engine Condition | Throttle Position | Upstream Region Pressure (inches of water) | Downstream Region Pressure (inches of water) | Spoiler Valve Condition | Charge Mixture |
|---|---|---|---|---|---|
| Starting-Cranking | Open | −6.0 | −6.0 | Open | Rich (normal) |
| Idling | Closed | −6.0 | −285.6 | Open | Rich |
| Deceleration Coasting | Closed | −6.0 | −340.0 | Open | Rich |
| Low Load-Level Driving, Cruising | Partly Open | −6.0 to −12.0 | −245.0 to −68.0 | Closed | Lean |
| Heavy Load-Acceleration, Climbing | Wide Open | −12.0 | −12.0 | Open | Rich |

Persons skilled in the gas engine art will recognize that the regulator valve is set so it will deliver fuel for the richest charge when atmospheric pressure is in regulator chamber 83a, and that leaning the charge results from diminishing the pressure therein. The economizer valve causes leaning when the manifold pressure is below about −41.0 inches of water. Leaning is prevented at idling and decelerating by the throttle valve "selection" or by the secondary spoiler valve.

This invention is not to be limited by the embodiments shown in the drawings and described in the description, which are given by way of example and not of limitation, but only in accordance with the scope of the appended claims.

I claim:

1. An economizer valve for use with a regulator which dispenses gaseous fuel to a mixing valve in the induction system of an internal combustion engine, said induction system having a mixing valve pressure region (upstream region) located upstream from a throttle valve and a manifold pressure region (downstream region) located downstream from said throttle valve, said economizer valve tending to cause the regulator to reduce the supply of fuel relative to the air flow in the induction system when pressure from the downstream region as low as or lower than a predetermined pressure is applied thereto so as to lean the charge, and to permit the charge to remain relatively richer at other conditions, said regulator including a regulator valve, a regulator chamber, and a diaphragm dividing the regulator chamber into two separate regulator regions, the setting of the regulator valve and the rate of flow of gas through it being determined at least in part by the pressure differential between said two regulator regions, said economizer valve comprising: a valve body with a control port for connection to that regulator region in which lesser pressure tends to close the regulator valve; an air inlet port; a spoiler valve between the air inlet port and the control port; an air bleed port interconnecting the control port and the atmosphere for restricted flow of air to the control port; a suction port for interconnecting said upstream region and said control port; and a spoiler valve actuator including a signal port for connection to the said downstream region, sufficiently low pressure in said valve actuator from said downstream region permitting closure of the spoiler valve.

2. An economizer valve according to claim 1 in which the size of the passage in the air bleed port is adjustable.

3. An economizer valve according to claim 1 in which the spoiler valve and the air bleed are in parallel connection between the air inlet port and the control port.

4. An economizer valve according to claim 3 in which the size of the passage in the air bleed port is adjustable.

5. An economizer valve according to claim 1 in which the spoiler valve is spring-loaded to its open condition, and in which the actuator is so disposed and arranged as to change that condition and close the spoiler valve upon the exertion of a sufficient suction thereto from the downstream region.

6. An economizer valve according to claim 5 in which the spoiler valve includes a valve seat and a valve seal, the valve seal being biased toward the valve seat so as to close the spoiler valve, and in which the actuator comprises a post and bias means adapted to press the post against the valve seal to open the valve unless said sufficient suction is exerted.

7. An economizer valve according to claim 6 in which the actuator includes a diaphram to which the post is attached and against which its spring bias bears.

8. A fuel supply system for dispensing gaseous fuel to a mixing valve in the induction system of an internal combustion engine, said induction system having a mixing valve pressure region (upstream region) located upstream from a throttle valve and a manifold pressure region (downstream region) located downstream from said throttle valve, said supply system including: a regulator including a regulator valve, a regulator chamber, and a diaphragm dividing the regulator chamber into two separate regulator regions, the setting of the regulator valve and the rate of flow of gas through it being determined at least in part by the pressure differential between said two regulator regions; and an economizer valve comprising: a valve body with a control port for connection to the one of the regulator regions in which lesser pressure tends to close the regulator valve; an air inlet port; a spoiler valve between the air inlet port and the control port; an air bleed port interconnecting the control port and the atmosphere for restricted flow of air to the control port; a suction port for interconnecting said upstream region and said control port; and a spoiler valve actuator including a signal post for connection to the said downstream region, sufficiently low pressure in said valve actuator from said downstream region permitting closure of the spoiler valve, said economizer valve tending to cause the regulator to reduce the supply of fuel relative to the air flow in the induction system when pressure from the downstream region as low as or lower than a predetermined pressure is applied thereto so as to lean the charge, and to permit the charge to remain relatively richer at other load conditions.

9. A fuel supply system according to claim 8 in which the size of the passage in the air bleed port is adjustable.

10. A fuel supply system according to claim 8 in which the spoiler valve and the air bleed valve are in parallel connection between the air inlet port and the control port.

11. A fuel supply system according to claim 10 in which the size of the passage in the air bleed port is adjustable.

12. A fuel supply system according to claim 8 in which the spoiler valve is spring-loaded to its open condition, and in which the actuator is so disposed and arranged as to change that condition and close the spoiler valve upon the exertion of a sufficient suction thereto from the downstream region.

13. A fuel supply system according to claim 12 in which the spoiler valve includes a valve seat and a valve seal, the valve seal being biased toward the valve seat so as to close the spoiler valve, and in which the actuator comprises a post and bias means adapted to press the post against the valve seal to open the valve unless said sufficient suction is exerted.

14. A fuel supply system according to claim 13 in which the actuator includes a diaphragm to which the post is attached and against which its spring bias bears.

15. A fuel supply system according to claim 8 including a secondary spoiler valve, said secondary spoiler valve cmprising: a spoiler port entering the one of the regulator regions in which a greater pressure tends to open the regulator valve, a valve plate adapted to close said spoiler port, and means between said valve plate and said diaphragm which moves the valve plate to open the spoiler port at predetermined positions of the diaphragm representative of low demand for fuel.

16. In combination: a regulator which dispenses gaseous fuel to a mixing valve in the induction system of an internal combustion engine, said induction system having a mixing valve pressure region (upstream region) located upstream from a throttle valve and a manifold pressure region (downstream region) located downstream from said throttle valve, said regulator including a regulator valve, a regulator chamber, and a diaphragm dividing the regulator chamber into two separate regulator regions, the setting of the regulator valve and the rate of flow of gas through it being determined at least in part by the pressure differential between said two regulator regions; and a secondary spoiler valve comprising an atmospheric spoiler port entering that regulator region in which a greater pressure tends to open the regulator valve, a valve plate adapted to close said spoiler port, and means between said spoiler plate and said diaphragm which moves the valve plate to open the spoiler port at predetermined positions of the diaphragm representative of low demand for fuel.

17. An economizer valve according to claim 1 in which a flow-limiting orifice is disposed between the suction port and the said upstream region.

18. A fuel system according to claim 8 in which a flow-limiting orifice is disposed between the suction port and the said upstream region.

19. A fuel system according to claim 15 in which a flow-limiting orifice is disposed between the suction port and the said upstream region.

20. An economizer valve according to claim 1 in which the signal port is connected to the induction system where the throttle valve communicates it to the upstream region when the throttle valve is closed, and to the downsteam region when the throttle valve is open.

21. A fuel supply system according to claim 8 in which the signal port is connected to the induction system where the throttle valve communicates it to the upstream region when the throttle valve is closed and to the downstream region when the throttle valve is open.

* * * * *